Dec. 20, 1949     E. DASH     2,491,479
ARC WELDING OF STUDS
Filed Nov. 12, 1948
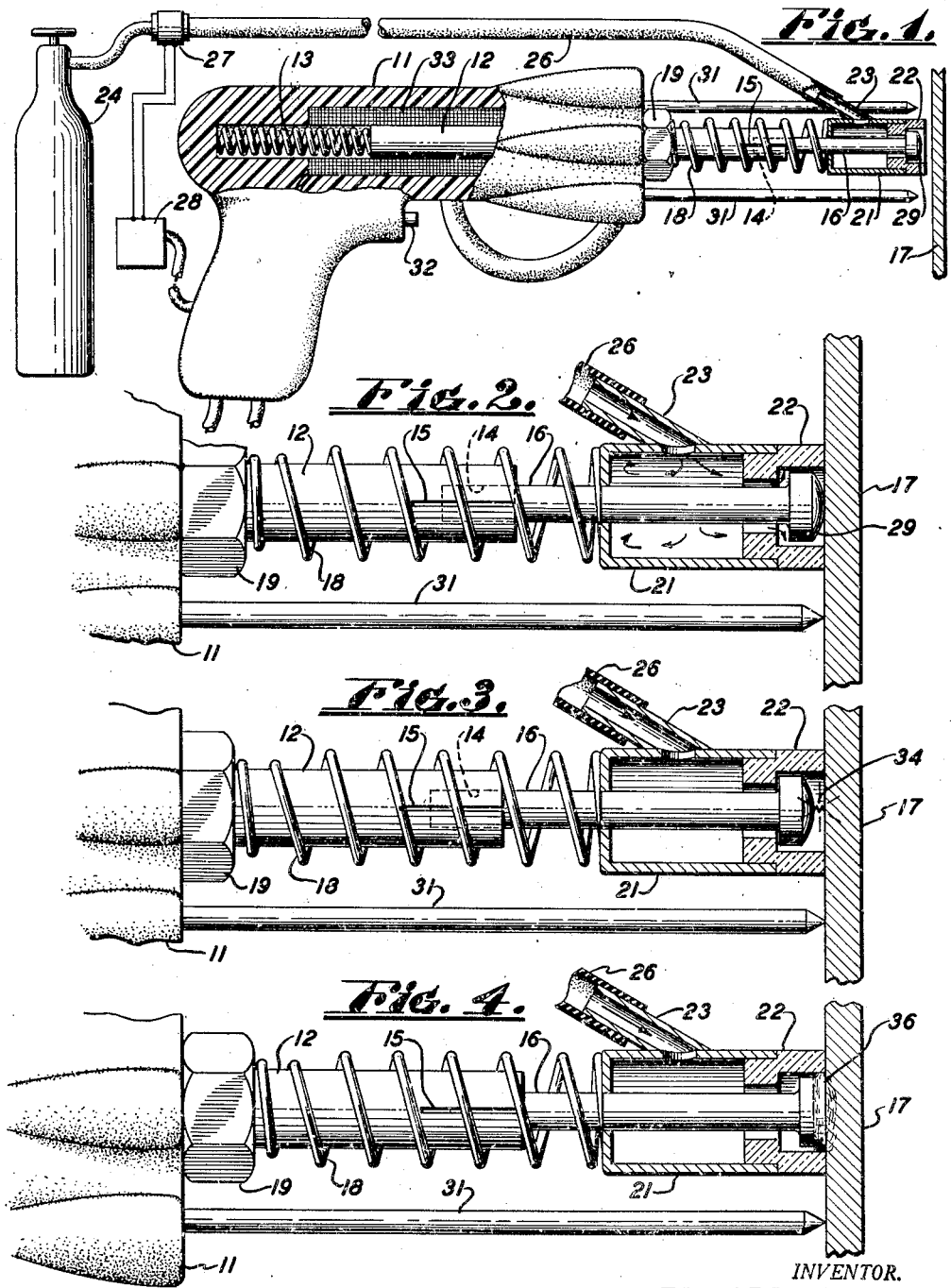
INVENTOR.
EDWARD DASH
BY
ATTORNEY Patented Dec. 20, 1949

2,491,479

UNITED STATES PATENT OFFICE 2,491,479

ARC WELDING OF STUDS

Edward Dash, Long Beach, Calif.

Application November 12, 1948, Serial No. 59,737

9 Claims. (Cl. 219—4)

(Granted under the act of March 3, 1883, as amended April 30, 1928; 370 O. G. 757)

This invention relates to stud welding, and more particularly to the art of arc welding an aluminum stud to an aluminum member, such as a plate or bulkhead.

It is an object of this invention to provide a method and apparatus for effectuating stronger and more uniform stud welds to aluminum members.

It is another object of this invention to provide a method and apparatus whereby an aluminum stud may be arc welded to an aluminum member in any position; that is, the welding operation may be effected with the stud pointing up, down, horizontally, or at any intermediate angle between these positions.

The arc welding method of this invention is characterized by a combination of two features: (1) the use of an aluminum stud juxtaposed adjacent an aluminum member, (2) surrounded at its juxtaposed end by an inert gas during the welding operation. More specifically, the invention is characterized by the use, with an inert gas, of a particular type of aluminum stud, namely, a stud having from 4.5 per cent to 6.0 per cent silicon.

Also in accordance with the instant invention, there is provided a useful apparatus for practicing the method aspect of the invention, this apparatus being a sleeve adapted to be fitted to the end of a welding gun and surrounding the stud. The sleeve has a nipple in the wall thereof through which a stream of inert gas may be constantly admitted to the weld region during the welding operation.

Other objects and many of the attendant advantages of the invention will be readily appreciated as the same become better understood by reference to the following description when considered in connection with the accompanying drawings, wherein:

Fig. 1 is an elevation, partially sectioned, of a stud welding gun holding a stud to be welded to a plate, the gun having mounted thereon the sleeve of the instant invention, which allows gas to be ejected into the region surrounding the welding operation; and Figs. 2, 3 and 4 are fragmentary detailed views, partially sectioned, showing certain steps in the method constituting the instant invention.

In Fig. 1, 11 designates a stud welding gun including a slidably mounted magnetic plunger 12, which reciprocates within a solenoid 33 in the barrel of the gun, being biased outwardly thereof by a helical spring 13 at the rear of the gun. The reciprocable plunger 12 extends from the muzzle of the stud gun and is axially bored at the end as shown at 14, to form a chuck for the reception of a stud 16, adapted to be welded to an aluminum member such as plate 17. The chuck end of the plunger 12 is also slotted as shown at 15 to lend added resiliency to the gripping of the stud 16.

In practicing the instant invention, the stud 16 is made primarily of aluminum and contains from 4.5 per cent to 6.0 per cent silicon.

More specifically, the stud 16 has the following general composition:

| | Per cent |
|---|---|
| Silicon | 4.5 to 6.0 |
| Iron | not over 0.8 |
| Copper | not over 0.4 |
| Manganese | not over 0.3 |
| Zinc | not over 0.2 |
| Titanium | not over 0.2 |
| Magnesium | not over 0.05 |
| Total other impurities | not over 0.3 |
| Aluminum | remainder |

Mounted around the chuck end of the plunger 12 is a helical spring 18, which abuts a nut 19 secured to the plunger 12, and forming a shoulder for the spring. The spring 18 extends somewhat beyond the chuck end of the plunger 12 so as to partially surround the stud 16. Secured as by spot welding or other suitable method to the extended end of the spring 18 is a sleeve 21, through which the stud 16 extends. The sleeve 21 is preferably made of metal and has fitted into the end thereof a porcelain or other ceramic ferrule 22, which is adapted to abut the plate 17 during the welding operation. Secured to the wall of the sleeve 21 is a nipple 23, by means of which an inert gas may be admitted to the region surrounding the end of the stud 16 during the welding operation.

The nipple 23 is connected to a source of inert gas, such as tank 24, through flexible tubing 26, this gas conduit including an on-off valve 27, which is preferably electrically controlled from a control source 28. A preferred gas is helium, although any suitable inert gas may be used.

The stud 16 is preferably formed with a somewhat hemispherical head 29, although it is to be understood that any form of stud may be used in the practice of the instant invention.

The invention is adapted for arc welding an aluminum stud to any suitable member, such as plate 17, the member preferably being substantially of aluminum, or having at least 75 per cent aluminum in its composition.

The operation of the instant invention will now be described with particular reference to Figs. 2, 3 and 4. The operator first inserts a stud 16 through the sleeve 21 and into the bore 14 in the chuck end of the plunger 12, where it is firmly held by frictional engagement. He then presses the gun and stud against the plate 17, as shown in Fig. 2, until the stop rods 31, mounted on the gun parallel to the plunger 12, abuts the plate 17. When the trigger 32 of the welding gun is actuated, the following described steps take place automatically, being controlled by means of the electric controller shown schematically at 28. First, the valve 27 is opened automatically to admit a stream of helium from the tank 24 to the interior of the sleeve 21, from which it passes out the extended end upon the plate 17. This drives air from that region and surrounds the abutting areas between stud 16 and plate 17 with a medium which is chemically inert.

Next in the automatic sequence of steps, the solenoid 33 is energized, pulling the plunger 12 backward into the body of the gun 11 against the force of the spring 13 to the position indicated in Fig. 3. Simultaneously, the welding current is initiated: from the energizing source, to the gun 11, to the chuck end of the plunger 12, thence to the stud 16, across the arcing area 34, to the plate 17, from whence it returns to the energizing source. The arc formed at 34 is maintained automatically for the necessary time in the inert atmosphere, following which solenoid 33 is automatically de-energized and the spring 13 forces the stud 16 against the plate 17. Simultaneously, the welding current is stopped. The hemispherical head 29 and the adjacent region of the plate 17, having been well-plasticized by the heat of the arc current, the stud 16 is readily forced against the plate 17 and integrated therewith, as shown in Fig. 4, by the pushing action of the spring 13. The ultimate configuration of the completed weld 36 is determined in part by the ceramic ferrule 22, which serves as a partial mold therefor by limiting outward spreading of the plasticized material. Immediately following the shutting off of the weld current and the de-energization of the solenoid 33, the valve 27 is automatically closed to complete a welding cycle.

The operator then withdraws the gun away from the plate 17, the stud 16 slipping from the bore 14 and remaining in place, welded to the plate 17. The gun is then ready for the reception of another stud 16, and a repetition of the stud welding operation at any other desired point on the plate 17.

Use of the particular stud described hereinbefore in the environment of an inert gas for arc welding has been found to produce welds of superior physical properties, such as tensile strength, ductility, fatigue strength, and impact strength, over stud welds not employing this particular combination. The method of the instant invention also has the advantage of being usable in any attitude of the welding gun; the gun may be pointed up, down, horizontally, or at any intermediate angle between these positions, with equally efficacious results.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. The method of automatically end welding a stud to a member which comprises juxtaposing the head end of a hemispherically headed stud adjacent the member, forming a welding arc between the stud and the member, surrounding the juxtaposed areas with an inert gas, said member being composed of at least 75 per cent aluminum, said stud having the following general composition:

| | Per cent |
|---|---|
| Silicon | 4.5 to 6.0 |
| Iron | not over 0.8 |
| Copper | not over 0.4 |
| Manganese | not over 0.3 |
| Zinc | not over 0.2 |
| Titanium | not over 0.2 |
| Magnesium | not over 0.05 |
| Total other impurities | not over 0.3 |
| Aluminum | remainder | and pressing said stud and member together to consummate the weld.

2. The method of automatically end welding a stud to a member which comprises juxtaposing the end of a stud adjacent the member, forming a welding arc between the stud and the member, surrounding the juxtaposed areas with an inert gas, said member being composed of at least 75 per cent aluminum, said stud having the following general composition:

| | Per cent |
|---|---|
| Silicon | 4.5 to 6.0 |
| Iron | not over 0.8 |
| Copper | not over 0.4 |
| Manganese | not over 0.3 |
| Zinc | not over 0.2 |
| Titanium | not over 0.2 |
| Magnesium | not over 0.05 |
| Total other impurities | not over 0.3 |
| Aluminum | remainder | and pressing said stud and member together to consummate the weld.

3. The method of automatically end welding a stud to a member which comprises juxtaposing the end of a stud adjacent the member, passing a welding current thru the stud and member to form an arc therebetween, filling the arc region with an inert gas, and pressing said stud and member together to consummate the weld, said stud being composed primarily of aluminum and containing between 4.5 percent and 6.0 percent silicon, and said member being composed of at least 75 percent aluminum.

4. In combination with a welding gun adapted to receive a stud to be welded to a member: a helical spring fitted securely over the end of the gun which receives the stud, a metal sleeve secured coaxially to the other end of said spring, a ceramic ferrule fitted to the extended end of said sleeve adapted to abut against the member and to prevent short circuiting between the sleeve and the member, and a nipple in the wall of said sleeve for admitting gas to the region surrounding the end of the stud.

5. In combination with a welding gun adapted to receive a stud to be welded to a member: a helical spring fitted securely over the end of the gun which receives the stud, a sleeve secured coaxially to the other end of said spring, the extended end of said sleeve being of ceramic material whereby it may be abutted against the member to prevent short circuiting between the stud and the member, and a nipple in the wall of said sleeve for admitting gas to the region surrounding the end of the stud.

6. In combination with a welding gun adapted to receive a stud to be welded to a member: a helical spring fitted securely over the end of the gun which receives the stud, a sleeve secured coaxially to the other end of said spring, and a nipple in the wall of said sleeve for admitting gas to the region surrounding the end of the stud.

7. A device for use in surrounding a stud welding operation with inert gas, comprising a metal sleeve adapted to be fitted around a stud held in a welding gun, a ceramic ferrule fitted to said sleeve at the end thereof, adapted to abut a member to which the stud is to be welded, and a nipple in the wall of said sleeve through which gas may be admitted to the region around the end of the stud.

8. A device for use in surrounding a stud welding operation with inert gas, comprising a sleeve adapted to be fitted around a stud held in a welding gun, the end of said sleeve being of ceramic material and thereby adapted to abut a member to which the stud is to be welded, and a nipple in the wall of said sleeve through which gas may be admitted to the region around the end of the stud.

9. A device for use in surrounding a stud welding operation with inert gas, comprising a sleeve adapted to be fitted around a stud held in a welding gun, and a nipple in the wall of said sleeve through which gas may be admitted to the region around the end of the stud.

EDWARD DASH.

REFERENCES CITED

The following references are of record in the file of this patent:

UNITED STATES PATENTS

| Number | Name | Date |
| --- | --- | --- |
| 1,716,614 | Bergman | June 11, 1929 |
| 1,746,081 | Hobart | Feb. 4, 1930 |
| 2,315,502 | Crecca et al. | Apr. 6, 1943 |
| 2,413,189 | Nelson | Dec. 24, 1946 |